(12) United States Patent
Zhang

(10) Patent No.: US 10,701,301 B2
(45) Date of Patent: Jun. 30, 2020

(54) VIDEO PLAYING METHOD AND DEVICE

(71) Applicant: Hangzhou Hikvision Digital Technology Co., Ltd., Zhejiang (CN)

(72) Inventor: Jing Zhang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/301,553

(22) PCT Filed: Dec. 23, 2016

(86) PCT No.: PCT/CN2016/111658
§ 371 (c)(1),
(2) Date: Nov. 14, 2018

(87) PCT Pub. No.: WO2017/197882
PCT Pub. Date: Nov. 23, 2017

(65) Prior Publication Data
US 2019/0297297 A1 Sep. 26, 2019

(30) Foreign Application Priority Data
May 16, 2016 (CN) .......................... 2016 1 0321258

(51) Int. Cl.
*H04N 5/445* (2011.01)
*G11B 27/036* (2006.01)
(Continued)

(52) U.S. Cl.
CPC ......... *H04N 5/44591* (2013.01); *G06T 7/194* (2017.01); *G11B 27/036* (2013.01);
(Continued)

(58) Field of Classification Search
CPC ............................................... H04N 5/44591
(Continued)

(56) References Cited

U.S. PATENT DOCUMENTS

| 2008/0159592 A1* | 7/2008 | Lin ................ H04N 21/234318 |
| | | 382/103 |
| 2010/0002071 A1 | 1/2010 | Ahiska |
| 2015/0095949 A1 | 4/2015 | Kim et al. |

FOREIGN PATENT DOCUMENTS

| CN | 1750659 | 3/2006 |
| CN | 101771878 | 7/2010 |
| | (Continued) | |

OTHER PUBLICATIONS

"Semantic Video Analysis for Adaptive Content Delivery and Automatic Description"; Cavallaro et al; IEEE Transactions on Circuits and Systems for Video Technology , vol. 15, No. 10, Oct. 2005; 10 pages.

(Continued)

*Primary Examiner* — Eileen M Adams
*Assistant Examiner* — Daniel T Tekle
(74) *Attorney, Agent, or Firm* — Mark E. Bandy; Rankin, Hill & Clark LLP

(57) ABSTRACT

Embodiments of the present application provide a method and apparatus for playing a video. The method includes: obtaining video information of each of moving objects contained in a currently played video frame image; updating a pre-created moving object pool based on the obtained video information of each of the moving objects; extracting, from the moving object pool, a size of a forefront moving object in the moving object pool and a position of the forefront moving object in the video frame image, obtaining a first sub-image containing the forefront moving object from the video frame image, and displaying the first sub-image in a first window; and sequentially obtaining second sub-images surrounding the forefront moving object from a cruising region of the video frame image, and displaying the second sub-images in a second window sequentially. Embodiments of the present application solve the problem (Continued)

that the video frame is too large to be easily viewed, and can also display the related information among the moving objects.

13 Claims, 3 Drawing Sheets

(51) Int. Cl.
*G11B 27/22* (2006.01)
*G06T 7/194* (2017.01)
*H04N 21/2343* (2011.01)
*H04N 21/431* (2011.01)

(52) U.S. Cl.
CPC ....... *G11B 27/22* (2013.01); *H04N 21/23439* (2013.01); *H04N 21/234318* (2013.01); *H04N 21/234345* (2013.01); *H04N 21/431* (2013.01)

(58) Field of Classification Search
USPC ....................................................... 386/230
See application file for complete search history.

(56) References Cited

FOREIGN PATENT DOCUMENTS

| | | |
|---|---|---|
| CN | 101866429 | 10/2010 |
| CN | 102158689 | 8/2011 |
| CN | 102857810 | 1/2013 |
| CN | 103020260 | 4/2013 |
| CN | 103414950 | 11/2013 |
| CN | 103533242 | 1/2014 |
| CN | 104168443 | 11/2014 |
| CN | 104581437 | 4/2015 |
| CN | 104639994 | 5/2015 |
| CN | 105519097 | 4/2016 |
| EP | 1835749 A1 | 9/2007 |

OTHER PUBLICATIONS

Extended European Search Report dated Apr. 16, 2019; App. No. 16902261.3; 6 pages.
CN Office Action dated Mar. 28, 2019; App No. 201610321258.0; 7 pages.
International Search Report dated Mar. 1, 2017; App No. PCT/CN2016/111658; 4 pages.

* cited by examiner

VIDEO PLAYING METHOD AND DEVICE

The present application claims the priority to a Chinese Patent Application No. 201610321258.0, filed with the State Intellectual Property Office of the People's Republic of China on May 16, 2016 and entitled "VIDEO PLAYING METHOD AND DEVICE", which is incorporated herein by reference in its entirety.

TECHNICAL FIELD

The present application relates to the technical field of video playing, and in particular to a method and apparatus for playing a video.

BACKGROUND

With the development of video acquisition technology, a video acquisition device can acquire video with higher and higher resolution. For example, in the field of video monitoring, in order to obtain a clear monitoring picture, a video acquisition device can be used to obtain a video with ultra-high resolution.

However, when a video with ultra-high resolution is played, if a video frame with ultra-high resolution is displayed directly on a terminal device, in particular on a terminal device with a smaller screen, such as a smart phone, an iPad, etc., it may lead to a problem that the video frame cannot be clearly viewed, due to the huge information of the video frame. For example, when a video frame with ultra-high resolution is displayed on a smart phone, because of the smaller screen of the smart phone, each object of the video frame in the screen is smaller, resulting in that each object of the video frame cannot be clearly viewed.

In general, meaningful information in the video frame relates to a moving object. For example, in the field of video monitoring, the information on a moving object, such as a person, a car, etc., is really meaningful, while other background information may not be what the viewer really cares about.

Therefore, a related method for playing a video is that when a video is played, for each frame of video image, a moving object in the video image is identified and only the moving object is displayed in the display screen. The video the viewer sees is the moving trajectory of the moving object included in the video frame. When a plurality of moving objects are included in the video frame, the viewer can switch among the plurality of moving objects and view the moving trajectory of a moving object that he/she wants to view.

In the above-described method, since only the moving object is displayed on the display screen, the moving object can occupy a larger display screen. Therefore, it is possible to solve the problem that the video frame is too large to be easily viewed.

However, in the above-described method, since the limited range of the moving object is targeted, some information related to the moving object cannot be obtained. For example, when the moving object is a person, there may be another person around talking to him/her. However, in the above-described method, at a certain time, only one person of them can be displayed on the display screen. If the user wants to view another person's picture, he/she has to switch between pictures. In other words, the conversation action between the two persons cannot be displayed on the display screen. Therefore, the related method for playing a video will lose some related information among the moving objects, causing poor user experience.

SUMMARY

Embodiments of the present application aim to provide a method and apparatus for playing a video, so as to solve the problem that the video frame is too large to be easily viewed, and display the related information among the moving objects, improving the user's experience. The specific technical solutions are as follows.

In a first aspect, an embodiment of the present application provides a method for playing a video. The method includes:

obtaining video information of each of moving objects contained in a currently played video frame image, wherein the video information of each of the moving objects includes at least: a position of this moving object in the video frame image and a size of this moving object;

updating a pre-created moving object pool based on the obtained video information of each of the moving objects;

extracting, from the moving object pool, a size of a forefront moving object in the moving object pool and a position of the forefront moving object in the video frame image, obtaining a first sub-image containing the forefront moving object from the video frame image based on the position of the forefront moving object in the video frame image and the size of the forefront moving object, and displaying the first sub-image in a first window; and sequentially obtaining second sub-images surrounding the forefront moving object from a cruising region of the video frame image, based on the position of the forefront moving object in the video frame image, the size of the forefront moving object, a preset cruising speed and a preset cruising region size, and displaying the second sub-images in a second window sequentially.

Optionally, updating a pre-created moving object pool based on the obtained video information of each of the moving objects, includes:

deleting original video information of each moving object in the moving object pool, and adding the video information of each of the moving objects into the pre-created moving object pool in an order in which the video information of each of the moving objects is obtained, wherein, video information of a moving object first added into the moving object pool is in the front of the moving object pool.

Optionally, the video information of each of the moving objects further includes: identification information of this moving object; and updating a pre-created moving object pool based on the obtained video information of each of the moving objects, includes:

for each of the moving objects, identifying whether the moving object pool contains video information of this moving object based on identification information of this moving object; and if so, updating video information corresponding to this moving object in the moving object pool by using the obtained video information of this moving object, or if not, adding the obtained video information of this moving object into the moving object pool; and deleting, from the moving object pool, video information of a moving object not contained in the current video frame image.

Optionally, the method further includes:

after sequentially obtaining second sub-images surrounding the forefront moving object from a cruising region of the video frame image, based on the position of the forefront moving object in the video frame image, the size of the forefront moving object, a preset cruising speed and a preset cruising region size, moving the video information of the forefront moving object to the end of the moving object pool.

Optionally, before sequentially obtaining second sub-images surrounding the forefront moving object from a cruising region of the video frame image, based on the position of the forefront moving object in the video frame image, the size of the forefront moving object, a preset cruising speed and a preset cruising region size, the method further includes:

determining a cruising speed and a cruising region size corresponding to the forefront moving object based on the size of the forefront moving object; and sequentially obtaining second sub-images surrounding the forefront moving object from a cruising region of the video frame image, based on the position of the forefront moving object in the video frame image, the size of the forefront moving object, a preset cruising speed and a preset cruising region size, includes:

sequentially obtaining the second sub-images surrounding the forefront moving object from a cruising region corresponding to the forefront moving object of the video frame image, based on the position of the forefront moving object in the video frame image, the size of the forefront moving object, the preset cruising speed and the preset cruising region size corresponding to the forefront moving object.

Optionally, obtaining video information of each of moving objects contained in a currently played video frame image, includes:

obtaining video information of each of moving objects, encapsulated in the video, corresponding to the currently played video frame image.

In a second aspect, an embodiment of the present application provides an apparatus for playing a video. The apparatus includes:

an obtaining module configured to obtain video information of each of moving objects contained in a currently played video frame image, wherein, the video information of each of the moving objects includes at least: a position of this moving object in the video frame image and a size of this moving object;

an update module configured to update a pre-created moving object pool based on the obtained video information of each of the moving objects;

a first execution module configured to extract, from the moving object pool, a size of a forefront moving object in the moving object pool and a position of the forefront moving object in the video frame image, obtain a first sub-image containing the forefront moving object from the video frame image based on the position of the forefront moving object in the video frame image and the size of the forefront moving object, and display the first sub-image in a first window; and a second execution module configured to sequentially obtain second sub-images surrounding the forefront moving object from a cruising region of the video frame image, based on the position of the forefront moving object in the video frame image, the size of the forefront moving object, a preset cruising speed and a preset cruising region size, and display the second sub-images in a second window sequentially.

Optionally, the update module is configured to delete original video information of each moving object in the moving object pool, and add the video information of each of the moving objects into the pre-created moving object pool in an order in which the video information of each of the moving objects is obtained, wherein, video information of a moving object first added into the moving object pool is in the front of the moving object pool.

Optionally, the video information of each of the moving objects further includes: identification information of this moving object; and the update module, includes:

a processing sub-module configured to, for each of the moving objects, identify whether the moving object pool contains video information of this moving object based on identification information of this moving object; and if so, update video information corresponding to this moving object in the moving object pool by using the obtained video information of this moving object, or if not, add the obtained video information of this moving object into the moving object pool; and a deleting sub-module configured to delete, from the moving object pool, video information of a moving object not contained in the current video frame image.

Optionally, the apparatus further includes:

a move module configured to move the video information of the forefront moving object to the end of the moving object pool, after the second sub-images surrounding the forefront moving object are sequentially obtained from the cruising region of the video frame image based on the position of the forefront moving object in the video frame image, the size of the forefront moving object, the preset cruising speed and the preset cruising region size.

Optionally, the apparatus further includes:

a determination module configured to determine a cruising speed and a cruising region size corresponding to the forefront moving object based on the size of the forefront moving object; and the second execution module is configured to sequentially obtain the second sub-images surrounding the forefront moving object from a cruising region corresponding to the forefront moving object of the video frame image, based on the position of the forefront moving object in the video frame image, the size of the forefront moving object, the preset cruising speed and the preset cruising region size corresponding to the forefront moving object.

Optionally, the obtaining module is configured to obtain video information of each of moving objects, encapsulated in the video, corresponding to the currently played video frame image.

In a third aspect, the present application provides a storage medium, wherein the storage medium is configured to store executable program codes which, when being executed, perform the method for playing a video as described in the above first aspect.

In a fourth aspect, the present application provides an application program which, when being executed, performs the method for playing a video as described in the above first aspect.

In a fifth aspect, the present application provides an electronic device, includes:

a processor, a memory, a communication interface and a communication bus, wherein, the processor, the memory, and the communication interface connect and communicate with each other via the communication bus;

the memory stores executable program codes; and the processor executes the executable program codes stored in the memory to perform the method for playing a video as described in the above first aspect.

With the method and apparatus for playing a video provided in the embodiments of the present application, the currently played video frame image can be displayed by means of two windows, wherein one window displays a moving object contained in the currently played video frame image, and the other window displays the related information of a region around the moving object. Therefore, the method and apparatus can solve the problem that the video frame is too large to be clearly viewed, while displaying related information among the moving objects. This improves the user's experience.

BRIEF DESCRIPTION OF THE DRAWINGS

In order to more clearly describe the technical solutions of the embodiments of the present application and of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to solve the problem that the video frame is too large to be clearly viewed and display the related information among the moving objects, the embodiments of the present application provide a method and apparatus for playing a video.

The technical solutions in the embodiments of the application will be described clearly and completely below in combination with the accompanying drawings of the embodiments of the application. Obviously, the embodiments described are merely a part of the embodiments of the present application, not all of the embodiments. All other embodiments obtained by those skilled in the art based on the embodiments of the present application without creative efforts shall fall within the protection scope of the application.

It should be noted that, the embodiments of the application and the features of the embodiments may be combined with each other, without conflict. The application will be described in detail with reference to the accompanying drawings and in combination with the embodiments.

Figure 1:
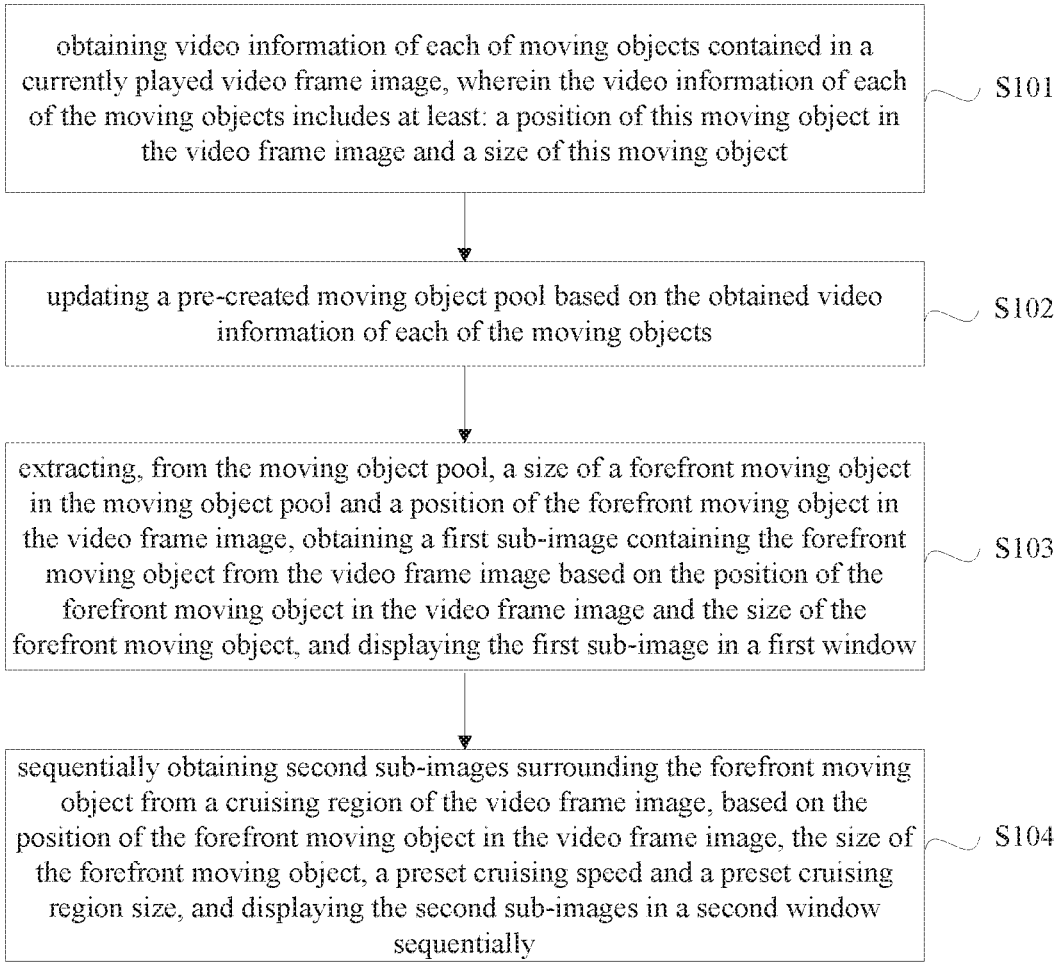
FIG. 1 is a flow chart of a method for playing a video provided by an embodiment of the present application.

In order to solve the problem that the video frame is too large to be clearly viewed and display the related information among the moving objects, an embodiment of the present application provides a method for playing a video. As shown in FIG. 1, the method can include the following steps.

S101, obtaining video information of each of moving objects contained in a currently played video frame image, wherein, the video information of each of the moving objects includes at least: a position of this moving object in the video frame image and a size of this moving object.

The method provided in the embodiment of the present application is applicable to an electronic device. Specifically, the electronic device may be any electronic device that can be used to play a video, such as a desktop computer, a portable computer, a mobile terminal, and the like.

In the embodiment of the present application, the electronic device can play a video obtained by the electronic device. For example, the electronic device can play a monitoring video acquired by a video acquisition device. The monitoring video can be a video with ultra-high resolution.

In general, effective information in the video frame relates to a moving object. Therefore, in order to solve the problem that video frame is too large to be clearly viewed when the electronic device plays a video with ultra-high resolution, the electronic device may obtain the video information of each moving object contained in the currently played video frame image.

The video information of each moving object obtained by the electronic device may include at least: the position of this moving object in the current video frame image and the size of this moving object.

For example, in order to play a video acquired by the video acquisition device in real time, the electronic device can perform real-time analysis on the acquired video, and obtain the video information of each moving object contained in the currently played video frame image.

Alternatively, in order to improve the real-time performance of video playing and avoid the delay caused by the real-time analysis of each video frame image by the electronic device, the video acquisition device may analyze the video it acquires, to obtain the video information of each moving object contained in each video frame image. In addition, in the process of sending the acquired video to the electronic device, the video acquisition device may encapsulate the video information of each moving object contained in each video frame image of the video in the video, to send them to the electronic device together.

Therefore, the electronic device can receive the video sent by the video acquisition device, and obtain the video information of each of moving objects, encapsulated in the video, corresponding to the currently played video frame image, when playing the video.

S102, updating a pre-created moving object pool based on the obtained video information of each of the moving objects.

In the embodiment of the present application, the electronic device may locally pre-create a moving object pool to store the video information of each moving object contained in the currently played video frame image. Optionally, a corresponding moving object is displayed based on the moving object pool.

After obtaining the video information of each moving object contained in the currently played video frame image, the electronic device can update the pre-created moving object pool based on the obtained video information of each moving object, so that the video information of each moving object contained in the currently played video frame image is stored in the moving object pool, to ensure the accuracy of the video information stored in the moving object pool.

S103, extracting, from the moving object pool, a size of a forefront moving object in the moving object pool and a position of the forefront moving object in the video frame image, obtaining a first sub-image containing the forefront moving object from the video frame image based on the position of the forefront moving object in the video frame image and the size of the forefront moving object, and displaying the first sub-image in a first window.

After updating the moving object pool based on the video information of each moving object contained in the currently played video frame image, the electronic device can extract, from the moving object pool, the size of the forefront moving object in the moving object pool and the position of the forefront moving object in the currently played video frame image.

In addition, the electronic device can obtain the first sub-image containing the forefront moving object from the video frame image based on the position of the forefront moving object in the currently played video frame image and the size of the forefront moving object, and display the first sub-image in the first window. It can be understood that the first sub-image obtained by the electronic device is an image containing only the moving object.

For example, after obtaining, from the moving object pool, the size of the forefront moving object and the position of the forefront moving object in the currently played video frame image, the electronic device can determine the position and the region size of the forefront moving object in the currently played video frame image. And then, the electronic device can obtain the image of the corresponding region from the currently played video frame image as the first sub-image, and display the first sub-image in the first window.

S104, sequentially obtaining second sub-images surrounding the forefront moving object from a cruising region of the video frame image, based on the position of the forefront moving object in the video frame image, the size of the forefront moving object, a preset cruising speed and a preset cruising region size, and displaying the second sub-images in a second window sequentially.

In the embodiment of the present application, in order to display related information of a moving object, when displaying the first sub-image containing the moving object in the first window, the electronic device can also sequentially obtain second sub-images surrounding the moving object from a cruising region of the video frame image, based on the position of the moving object in the currently displayed video frame image, the size of the moving object, and a preset cruising speed and a preset cruising region size, and display the second sub-images in a second window sequentially.

For example, after obtaining, from the moving object pool, the size of the forefront moving object in the moving object pool and the position of the forefront moving object in the currently played video frame image, the electronic device can determine the position and the size of the region of the forefront moving object in the currently played video frame image.

Further, taking the region as a center, a corresponding number of second sub-images are obtained sequentially from the currently played video frame image, according to a circular cruising region of a preset size and the number of second sub-images to be obtained which is determined based on the preset cruising speed. Also, all of the second sub-images are displayed in the second window.

It should be noted that the first window and the second window in the embodiments of the present application may be two independent windows distributed in different regions on the display screen of the electronic device. The size of the first window and the size of the second window may be the same or different.

Figure 2:
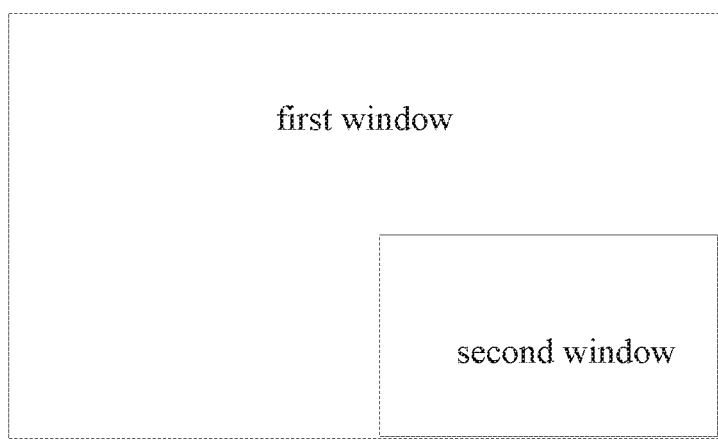
FIG. 2 is an exemplary schematic diagram of displaying a first sub-image and a second sub-image by means of a first window and a second window according to an embodiment of the present application.

For example, FIG. 2 shows an exemplary schematic diagram of a first window and a second window according to an embodiment of the present application. As shown in FIG. 2, in the embodiment of the present application, a main window may be used as the first window to display a moving object, and a small window may be used as the second window to display related information of a region around the moving object.

With the method for playing a video provided by the embodiment of the present application, the currently played video frame image can be displayed by means of two windows, wherein one window displays a moving object contained in the currently played video frame image, and the other window displays the related information of a region around the moving object. Therefore, the method can solve the problem that the video frame is too large to be clearly viewed, while displaying related information among the moving objects, so that the user's experience is improved.

In an implementation of the present application, in order to obtain each moving object contained in the currently played video frame image and update the pre-created moving object pool, the electronic device can firstly delete original video information of each moving object in the moving object pool, and add video information of each moving object into the pre-created moving object pool in an order in which video information of each moving object is obtained. The video information of the moving object first added into the moving object pool is in the front of the moving object pool.

It can be understood that, in the process of obtaining the video information of each moving object contained in each video frame image though analysis, the video acquisition device or the electronic device can firstly detect each moving object contained in each video frame image, and then obtain and store the video information of each moving object.

Therefore, in order to store the video information of each moving object contained in each video frame image, the video acquisition device or the electronic device may first store video information of a moving object detected first according to an order in which each moving object is detected.

In order to update the pre-created moving object pool based on the obtained video information of each moving object contained in the currently played video frame image, the electronic device can also obtain video information of each moving object contained in the pre-stored video frame image in order. For example, the video information stored first is obtained firstly. Further, the video information of each moving object is added into the pre-created moving object pool according to the obtaining order.

That is, the electronic device first obtains video information of a moving object contained in each video frame image, which is detected first by the video acquisition device or the electronic device.

It should be noted that, the electronic device or the video acquisition device may detect each moving object contained in each video frame image by employing existing technologies, which will be not described in detail in the present application.

In general, in order to detect each moving object contained in each video frame image, an electronic device or a video acquisition device can firstly detect a relatively obvious moving object in each video frame image, such as a relatively fast moving object or a larger object.

Therefore, the video information of each moving object is stored according to the order for detecting each moving object, and the video information of each moving object is added into the moving object pool according to an order in which each moving object is obtained, which can ensure that a relatively obvious moving object is first added into the moving object pool. Optionally, in the process of displaying a moving object, it can also be ensured that a relatively obvious moving object is first displayed, so that the main information in the video is better displayed, thereby improving the user's experience.

As another implementation of the present application, the video information of each moving object contained in the currently played video frame image obtained by the electronic device can further include identification information of each moving object, such as a serial number of each moving object.

In this case, in order to update the pre-created moving object pool based on the obtained video information of each moving object, for each moving object, the electronic device can identify whether the moving object pool contains video information of this moving object based on identification information of this moving object; and if so, update video information corresponding to this moving object in the moving object pool by using the obtained video information of this moving object, or if not, add the obtained video information of this moving object into the moving object pool. Optionally, video information of a moving object not contained in the current video frame image is deleted from the moving object pool.

According to the identification information of each moving object, it is identified whether the video information of the moving object already exists in the moving object pool. When the video information of the moving object already exists in the moving object pool, it is indicated that the moving object exists in the previous video frame image.

In this case, updating the video information of the moving object in the moving object pool by using the obtained video information of the moving object in the currently played video frame image can ensure that when the video information of the moving object is in a relatively back of the video information of moving objects in the current video frame image, and the video information of the moving object is in a relatively front of the moving object pool, the video information of the moving object can still be at the relatively front position in the moving object pool, so that the moving object can be earlier displayed.

In other words, since a moving object appearing in a plurality of video frame images may be more useful information, the moving object is ranked at a relatively front position in the moving object pool, which may cause the moving object to be displayed earlier, so as to improve the user's experience.

In addition, there may be a case where the currently played video frame image is switched to the next video frame when the electronic device is displaying a moving object in the currently played video frame image. In this case, if the moving object still exists in the next video frame, the electronic device will not delete the video information of the moving object in the moving object pool and only updates the video information of the moving object in the moving object pool, when detecting that the moving object exists in the current video frame. As such, it can be ensured that the currently displayed moving object is not interrupted.

As another implementation of the present application, before sequentially obtaining second sub-images surrounding a moving object from a cruising region of a video frame image, based on the position of the moving object in the video frame image, the size of the moving object, a preset cruising speed and a preset cruising region size, the electronic device can further determine a cruising speed and a cruising region size corresponding to the moving object based on the size of the moving object.

For example, the electronic device can preset the relationship between a size of a moving object and a cruising speed and a cruising region size of the moving object. For example, the larger the moving object is, the larger the cruising speed and the cruising region may be.

Optionally, in order to obtain each second sub-image surrounding the moving object, the electronic device can sequentially obtain each second sub-image surrounding the moving object from a cruising region corresponding to the moving object in the video frame image, based on the position of the moving object in the video frame image, the size of the moving object, and a cruising speed and a cruising region size corresponding to the moving object.

When a moving object is larger, the related information of a region around it may also occupy a larger region. When a moving object is smaller, the related information of a region around it may also occupy a smaller region. Therefore, by determining a cruising speed and a cruising region size corresponding to a moving object based on the size of the moving object, and then obtaining each second sub-image based on the cruising speed and the cruising region size, the related information of a region around the moving object can be more accurately obtained, thereby improving the user's experience.

Figure 3:
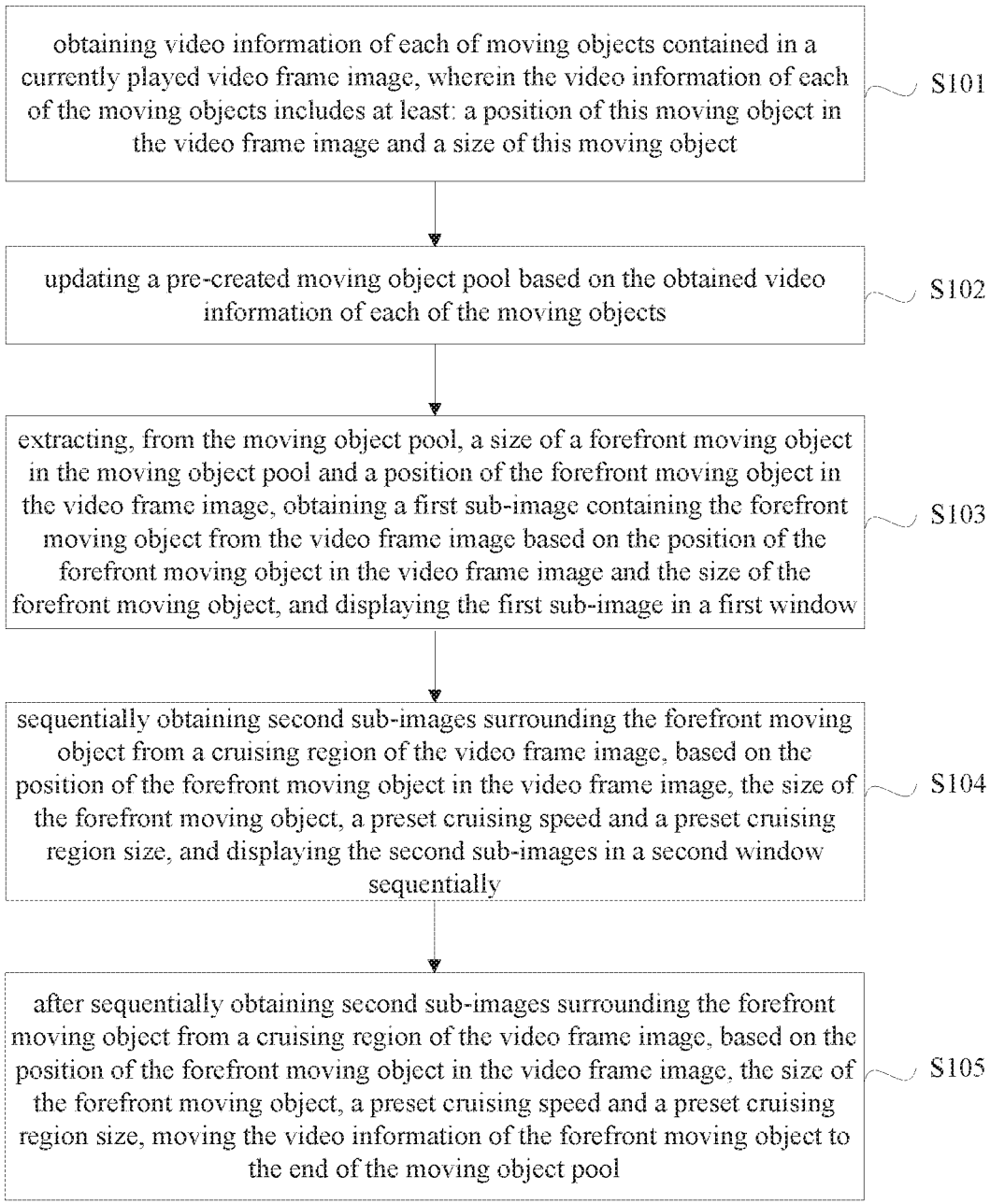
FIG. 3 is another flow chart of a method for playing a video provided by an embodiment of the present application.

As another implementation of the present application, as shown in FIG. 3, the method for playing a video provided in the embodiment of the present application can further include:

S105, after sequentially obtaining second sub-images surrounding the forefront moving object from a cruising region of the video frame image, based on the position of the forefront moving object in the video frame image, the size of the forefront moving object, and a preset cruising speed and a preset cruising region size, moving the video information of the forefront moving object to the end of the moving object pool.

In the embodiment of the present application, after sequentially obtaining each second sub-image surrounding the forefront moving object in one circle from the cruising region of the video frame image, based on the position of the forefront moving object in the video frame image, the size of the forefront moving object, and the preset cruising speed and the preset cruising region size, the electronic device can move the video information of the forefront moving object to the end of the moving object pool.

In order to obtain video information of a moving object and display the moving object, the electronic device first obtains the video information of the forefront moving object in the moving object pool. In some cases, a plurality of moving objects can be contained in each video frame image. Therefore, the moving object pool can also contain video information of a plurality of moving objects.

After obtaining each second sub-image surrounding one moving object in one circle, the electronic device moves the video information of the moving object to the end of the moving object pool, so that when video information of a plurality of moving objects are contained in the moving object pool, video information of another moving object may be in the forefront of the moving object pool, and then the electronic device can display the moving object. Therefore, it can be ensured that the electronic device can display the plurality of moving objects contained in the current video frame image.

Corresponding to the above method embodiments, the embodiments of the present application further provide a corresponding apparatus.

Figure 4:
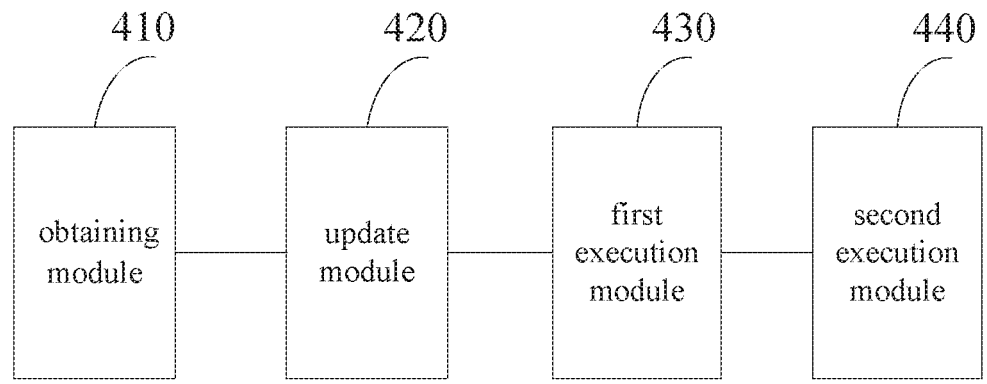
FIG. 4 is a schematic structural diagram of an apparatus for playing a video provided by an embodiment of the present application.

FIG. 4 is an apparatus for playing a video provided by an embodiment of the present application. The apparatus includes:

an obtaining module 410 configured to obtain video information of each of moving objects contained in a currently played video frame image, wherein, the video information of each of the moving objects includes at least: a position of this moving object in the video frame image and a size of this moving object;

an update module 420 configured to update a pre-created moving object pool based on the obtained video information of each of the moving objects;

a first execution module 430 configured to extract, from the moving object pool, a size of a forefront moving object in the moving object pool and a position of the forefront moving object in the video frame image, obtain a first sub-image containing the forefront moving object from the video frame image based on the position of the forefront moving object in the video frame image and the size of the forefront moving object, and display the first sub-image in a first window; and a second execution module 440 configured to sequentially obtain second sub-images surrounding the forefront moving object from a cruising region of the video frame image, based on the position of the forefront moving object in the video frame image, the size of the forefront moving object, a preset cruising speed and a preset cruising region size, and display the second sub-images in a second window sequentially.

With the apparatus for playing a video provided by the embodiment of the present application, the currently played video frame image can be displayed by means of two windows, wherein one window displays a moving object contained in the currently played video frame image, and the other window displays the related information of a region around the moving object. Therefore, the apparatus can solve the problem that the video frame is too large to be clearly viewed, while displaying related information among the moving objects. Thus, this improves the user's experience.

As an implementation of the present application, the update module 420 is configured to delete original video information of each moving object in the moving object pool, and add the video information of each of the moving objects into the pre-created moving object pool in an order in which the video information of each of the moving objects is obtained, wherein, video information of a moving object first added into the moving object pool is in the front of the moving object pool.

As another implementation of the present application, the video information of each of the moving objects further includes: identification information of this moving object; and the update module 420, includes:

a processing sub-module (not shown in the figure) configured to, for each of the moving objects, identify whether the moving object pool contains video information of this moving object based on identification information of this moving object; and if so, update video information corresponding to this moving object in the moving object pool by using the obtained video information of this moving object, or if not, add the obtained video information of this moving object into the moving object pool;

a deleting sub-module (not shown in the figure) configured to delete, from the moving object pool, video information of a moving object not contained in the current video frame image.

Figure 5:
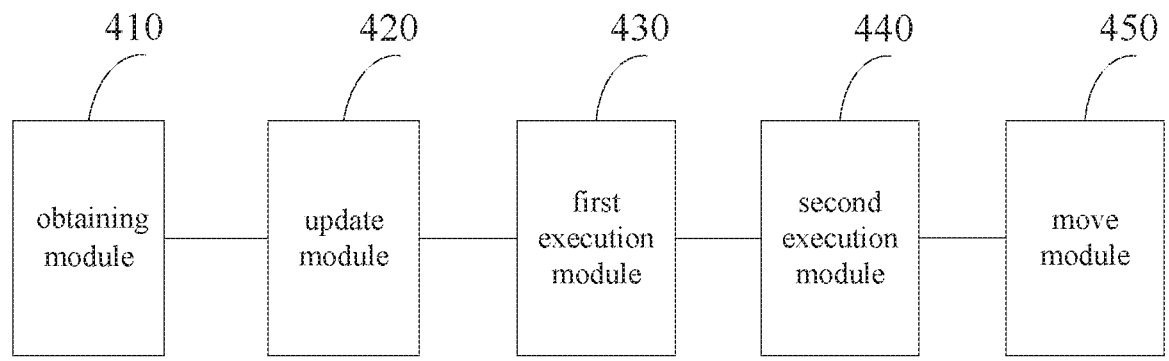
FIG. 5 is another schematic structural diagram of an apparatus for playing a video provided by an embodiment of the present application.

As another implementation of the present application, as shown in FIG. 5, the apparatus further includes:

a move module 450 configured to move the video information of the forefront moving object to the end of the moving object pool, after the second sub-images surrounding the forefront moving object are sequentially obtained from the cruising region of the video frame image based on the position of the forefront moving object in the video frame image, the size of the forefront moving object, the preset cruising speed and the preset cruising region size.

As another implementation of the present application, the apparatus further includes:

a determination module (not shown in the figure) configured to determine a cruising speed and a cruising region size corresponding to the forefront moving object based on the size of the forefront moving object; and the second execution module 440 is configured to sequentially obtain the second sub-images surrounding the forefront moving object from a cruising region corresponding to the forefront moving object of the video frame image, based on the position of the forefront moving object in the video frame image, the size of the forefront moving object, the preset cruising speed and the preset cruising region size corresponding to the forefront moving object.

As another implementation of the present application, the obtaining module 410 is configured to obtain video information of each of moving objects, encapsulated in the video, corresponding to the currently played video frame image.

Correspondingly, the present application further provides a storage medium, wherein the storage medium is configured to store executable program codes which, when being executed, perform the method for playing a video described in the present application. The method for playing a video described in the present application includes:

obtaining video information of each of moving objects contained in a currently played video frame image, wherein the video information of each of the moving objects includes at least: a position of this moving object in the video frame image and a size of this moving object;

updating a pre-created moving object pool based on the obtained video information of each of the moving objects;

extracting, from the moving object pool, a size of a forefront moving object and a position of the forefront moving object in the video frame image, obtaining a first sub-image containing the forefront moving object from the video frame image based on the position of the forefront moving object in the video frame image and the size of the forefront moving object, and displaying the first sub-image in a first window; and sequentially obtaining second sub-images surrounding the forefront moving object from a cruising region of the video frame image, based on the position of the forefront moving object in the video frame image, the size of the forefront moving object, a preset cruising speed and a preset cruising region size, and displaying the second sub-images in a second window sequentially.

In the embodiment of the present application, the currently played video frame image can be displayed by means of two windows, wherein one window displays a moving object contained in the currently played video frame image, and the other window displays the related information of a region around the moving object. Therefore, the apparatus can solve the problem that the video frame is too large to be clearly viewed, while displaying related information among the moving objects. Thus, this improves the user's experience.

Correspondingly, the present application further provides an application program which, when being executed, performs the method for playing a video described in the present application. The method for playing a video described in the present application includes:

obtaining video information of each of moving objects contained in a currently played video frame image, wherein the video information of each of the moving objects includes at least: a position of this moving object in the video frame image and a size of this moving object;

updating a pre-created moving object pool based on the obtained video information of each of the moving objects;

extracting, from the moving object pool, a size of a forefront moving object and a position of the forefront moving object in the video frame image, obtaining a first sub-image containing the forefront moving object from the video frame image based on the position of the forefront moving object in the video frame image and the size of the forefront moving object, and displaying the first sub-image in a first window; and sequentially obtaining second sub-images surrounding the forefront moving object from a cruising region of the video frame image, based on the position of the forefront moving object in the video frame image, the size of the forefront moving object, a preset cruising speed and a preset cruising region size, and displaying the second sub-images in a second window sequentially.

In the embodiment of the present application, the currently played video frame image can be displayed by means of two windows, wherein one window displays a moving object contained in the currently played video frame image, and the other window displays the related information of a region around the moving object. Therefore, the apparatus can solve the problem that the video frame is too large to be clearly viewed, while displaying related information among the moving objects. Thus, this improves the user's experience.

Correspondingly, the present application further provides an electronic device, includes:

a processor, a memory, a communication interface and a communication bus, wherein, the processor, the memory, and the communication interface connect and communicate with each other via the communication bus;

the memory stores executable program codes;

the processor executes the executable program codes stored in the memory to perform the method for playing a video described in the present application. The method for playing a video described in the present application includes:

obtaining video information of each of moving objects contained in a currently played video frame image, wherein the video information of each of the moving objects includes at least: a position of this moving object in the video frame image and a size of this moving object;

updating a pre-created moving object pool based on the obtained video information of each of the moving objects;

extracting, from the moving object pool, a size of a forefront moving object in the moving object pool and a position of the forefront moving object in the video frame image, obtaining a first sub-image containing the forefront moving object from the video frame image based on the position of the forefront moving object in the video frame image and the size of the forefront moving object, and displaying the first sub-image in a first window; and sequentially obtaining second sub-images surrounding the forefront moving object from a cruising region of the video frame image, based on the position of the forefront moving object in the video frame image, the size of the forefront moving object, a preset cruising speed and a preset cruising region size, and displaying the second sub-images in a second window sequentially.

In the embodiment of the present application, the currently played video frame image can be displayed by means of two windows, wherein one window displays a moving object contained in the currently played video frame image, and the other window displays the related information of a region around the moving object. Therefore, the apparatus can solve the problem that the video frame is too large to be clearly viewed, while displaying related information among the moving objects, so that the user's experience is improved.

For the apparatus/storage medium/application/electronic device embodiment, since it is basically similar to the method embodiment, the description is relatively simple, and the related parts can refer to the partial description of the method embodiment.

It should be noted that the relationship terms used here, such as "first," "second," and the like are only used to distinguish one entity or operation from another entity or operation, but do not necessarily require or imply that there is actual relationship or order between these entities or operations. Moreover, the terms "comprise", "include", or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for playing a video, comprising:
   obtaining video information of each of moving objects contained in a currently played video frame image, wherein the video information of each of the moving objects comprises at least: a position of this moving object in the video frame image and a size of this moving object;

updating a pre-created moving object pool based on the obtained video information of each of the moving objects;

extracting, from the moving object pool, a size of a forefront moving object in the moving object pool and a position of the forefront moving object in the video frame image, obtaining a first sub-image containing the forefront moving object from the video frame image based on the position of the forefront moving object in the video frame image and the size of the forefront moving object, and displaying the first sub-image in a first window; and sequentially obtaining second sub-images surrounding the forefront moving object from a cruising region of the video frame image, based on the position of the forefront moving object in the video frame image, the size of the forefront moving object, a preset cruising speed and a preset cruising region size, and displaying the second sub-images in a second window sequentially.

2. The method of claim 1, wherein updating a pre-created moving object pool based on the obtained video information of each of the moving objects, comprises:

deleting original video information of each moving object in the moving object pool, and adding the video information of each of the moving objects into the pre-created moving object pool in an order in which the video information of each of the moving objects is obtained, wherein, video information of a moving object first added into the moving object pool is in the front of the moving object pool.

3. The method of claim 1, wherein the video information of each of the moving objects further comprises: identification information of this moving object; and updating a pre-created moving object pool based on the obtained video information of each of the moving objects, comprises:

for each of the moving objects, identifying whether the moving object pool contains video information of this moving object based on identification information of this moving object; and if so, updating video information corresponding to this moving object in the moving object pool by using the obtained video information of this moving object, or if not, adding the obtained video information of this moving object into the moving object pool; and deleting, from the moving object pool, video information of a moving object not contained in the current video frame image.

4. The method of claim 1, wherein the method further comprises:

after sequentially obtaining second sub-images surrounding the forefront moving object from a cruising region of the video frame image, based on the position of the forefront moving object in the video frame image, the size of the forefront moving object, a preset cruising speed and a preset cruising region size, moving the video information of the forefront moving object to the end of the moving object pool.

5. The method of claim 1, wherein before sequentially obtaining second sub-images surrounding the forefront moving object from a cruising region of the video frame image, based on the position of the forefront moving object in the video frame image, the size of the forefront moving object, a preset cruising speed and a preset cruising region size, the method further comprises:

determining a cruising speed and a cruising region size corresponding to the forefront moving object based on the size of the forefront moving object; and sequentially obtaining second sub-images surrounding the forefront moving object from a cruising region of the video frame image, based on the position of the forefront moving object in the video frame image, the size of the forefront moving object, a preset cruising speed and a preset cruising region size, comprises:

sequentially obtaining the second sub-images surrounding the forefront moving object from a cruising region corresponding to the forefront moving object of the video frame image, based on the position of the forefront moving object in the video frame image, the size of the forefront moving object, the preset cruising speed and the preset cruising region size corresponding to the forefront moving object.

6. The method of claim 1, wherein obtaining video information of each of moving objects contained in a currently played video frame image, comprises:

obtaining video information of each of moving objects, encapsulated in the video, corresponding to the currently played video frame image.

7. A non-transitory computer-readable medium for storing executable program codes which, when being executed, perform a method for playing a video, comprising:

obtaining video information of each of moving objects contained in a currently played video frame image, wherein the video information of each of the moving objects comprises at least: a position of this moving object in the video frame image and a size of this moving object;

updating a pre-created moving object pool based on the obtained video information of each of the moving objects;

extracting, from the moving object pool, a size of a forefront moving object in the moving object pool and a position of the forefront moving object in the video frame image, obtaining a first sub-image containing the forefront moving object from the video frame image based on the position of the forefront moving object in the video frame image and the size of the forefront moving object, and displaying the first sub-image in a first window; and sequentially obtaining second sub-images surrounding the forefront moving object from a cruising region of the video frame image, based on the position of the forefront moving object in the video frame image, the size of the forefront moving object, a preset cruising speed and a preset cruising region size, and displaying the second sub-images in a second window sequentially.

8. The computer-readable storage medium of claim 7, wherein updating a pre-created moving object pool based on the obtained video information of each of the moving objects, comprises:

deleting original video information of each moving object in the moving object pool, and adding the video information of each of the moving objects into the pre-created moving object pool in an order in which the video information of each of the moving objects is obtained, wherein, video information of a moving object first added into the moving object pool is in the front of the moving object pool.

9. The computer-readable storage medium of claim 7, wherein the video information of each of the moving objects further comprises: identification information of this moving object; and
  updating a pre-created moving object pool based on the obtained video information of each of the moving objects, comprises:
  for each of the moving objects, identifying whether the moving object pool contains video information of this moving object based on identification information of this moving object; and if so, updating video information corresponding to this moving object in the moving object pool by using the obtained video information of this moving object, or if not, adding the obtained video information of this moving object into the moving object pool; and
  deleting, from the moving object pool, video information of a moving object not contained in the current video frame image.

10. The computer-readable storage medium of claim 7, wherein the method further comprises:
  after sequentially obtaining second sub-images surrounding the forefront moving object from a cruising region of the video frame image, based on the position of the forefront moving object in the video frame image, the size of the forefront moving object, a preset cruising speed and a preset cruising region size, moving the video information of the forefront moving object to the end of the moving object pool.

11. The computer-readable storage medium of claim 7, wherein before sequentially obtaining second sub-images surrounding the forefront moving object from a cruising region of the video frame image, based on the position of the forefront moving object in the video frame image, the size of the forefront moving object, a preset cruising speed and a preset cruising region size, the method further comprises:
  determining a cruising speed and a cruising region size corresponding to the forefront moving object based on the size of the forefront moving object; and
  sequentially obtaining second sub-images surrounding the forefront moving object from a cruising region of the video frame image, based on the position of the forefront moving object in the video frame image, the size of the forefront moving object, a preset cruising speed and a preset cruising region size, comprises:
  sequentially obtaining the second sub-images surrounding the forefront moving object from a cruising region corresponding to the forefront moving object of the video frame image, based on the position of the forefront moving object in the video frame image, the size of the forefront moving object, the preset cruising speed and the preset cruising region size corresponding to the forefront moving object.

12. The computer-readable storage medium of claim 7, wherein obtaining video information of each of moving objects contained in a currently played video frame image, comprises:
  obtaining video information of each of moving objects, encapsulated in the video, corresponding to the currently played video frame image.

13. An electronic device, comprises:
  a processor, a memory, a communication interface and a communication bus, wherein,
  the processor, the memory, and the communication interface connect and communicate with each other via the communication bus;
  the memory stores executable program codes;
  the processor executes the executable program codes stored in the memory to perform the method for playing a video of claim 1.

* * * * *